United States Patent [19]
Adanuvor

[11] Patent Number: 6,117,209
[45] Date of Patent: Sep. 12, 2000

[54] HYDROMETALLURGICAL PROCESS FOR TREATING ALLOYS AND DROSSES TO RECOVER THE METAL COMPONENTS

[75] Inventor: Prosper K. Adanuvor, Eagan, Minn.

[73] Assignee: GNB Technologies, Inc., Mendota Heights, Minn.

[21] Appl. No.: 09/184,376

[22] Filed: Nov. 2, 1998

[51] Int. Cl.$^7$ .................................................. C21B 15/00
[52] U.S. Cl. ................ 75/739; 75/740; 423/87; 423/92; 423/98; 423/658.3
[58] Field of Search ............. 75/743, 739, 740; 423/87, 95, 658.5, 92, 98, 658.3; 429/29

[56] References Cited

U.S. PATENT DOCUMENTS

| | | | |
|---|---|---|---|
| 5,053,076 | 10/1991 | Burany et al. | 75/699 |
| 5,961,691 | 10/1999 | Pinard et al. | 75/743 |

Primary Examiner—Jill Warden
Assistant Examiner—Tima McGuthry-Banks
Attorney, Agent, or Firm—Leydig, Voit & Mayer, Ltd.

[57] ABSTRACT

A hydrometallurgical method involves treating a dross source containing typically both antimony and tin and treating the dross to a series of chemical operations to yield a soft lead precursor, suitable for making soft lead for lead-based alloys for batteries or other applications, which method includes utilizing sulfuric acid to decompose the dross source to provide a slurry in which the liquid contains the principal tin values and the solid phase contains the antimony and lead values, followed by treating of the separated solid phase so as to either separate the lead values from the antimony values via an antimony leach and a solid/liquid separation or by desulfurizing the solid phase, carrying out a solid/liquid separation, treating the solid phase with a lead leach to solubilize the lead values and carrying out a further solid/liquid separation to recover the lead-rich phase as the filtrate, separated from the antimony-rich solid phase.

10 Claims, 2 Drawing Sheets

HYDROMETALLURGICAL PROCESS FOR TREATING ALLOYS AND DROSSES TO RECOVER THE METAL COMPONENTS

FIELD OF THE INVENTION

This invention relates to hydrometallurgical processes and, more particularly, to processes for removing, and recovering, the constituents of lead-bearing materials resulting from scrap lead, battery lead, lead drosses and the like.

BACKGROUND OF THE INVENTION

Antimony and tin are commonly used as principal alloying ingredients in a variety of lead-based alloys, such as, for example, as have been used in lead-acid cells and batteries.

Accordingly, the removal of tin, antimony, and other metals associated with lead becomes a primary consideration during the processing of lead-bearing materials, in particular, secondary sources of lead such as scrap lead, battery lead and lead drosses, so that refined soft lead can be obtained (the term "soft lead" simply referring to lead of sufficient purity so that it is soft and can be used for various alloys, as is known). More particularly, the demand for soft lead has been on the increase, spurred on, in part, by a shift in the battery industry over the years from the use of predominantly antimony-based lead alloys to calcium-based lead alloys and other non-antimony lead-based alloys. As is known, soft lead is needed to make calcium-based, lead-based alloys. The production of such soft lead involves extensive de-tinning and removal of antimony from lead bullion produced by secondary smelting of battery scraps, slags, drosses, baghouse dust or metallic scraps.

Traditional methods for extracting impurities and purifying lead from lead-bearing materials has often involved smelting the material in pyrometallurgical furnaces, such as a reverbatory, blast, rotary or electric furnace, followed by a variety of pyrometallurgical treatments to reduce the impurity levels in the lead to acceptable levels.

The tin, antimony and other impurities in the lead are typically captured in the dross or slag. Processing of drosses and slags is often handled differently depending upon the requirements of the processing plants.

Some plants strive to recover the metal values by selective oxidation and reduction practices via process pyrometallurgy. A typical example is the type of process in which impurities such as tin, antimony, arsenic, or tellurium are removed as salt melts by pyrometallurgic techniques. This treatment is then followed by a hydrometallurgical treatment to recover the metal values. The main disadvantages of this type of process are that such processes are extremely labor and capital intensive, typically requiring the consumption of expensive reagents such as caustic soda and sodium nitrate.

In some plants, drosses can also be smelted separately; and the alloy product resulting used as a master alloy additive. However, the presence of high levels of both tin and antimony in the dross could make this approach less appealing.

An alternative approach which has been used involves the drossing out of tin and antimony from the lead stream at one stage of the process to obtain soft lead. The dross is then recycled back into the metallurgical furnace system. However, this option, when combined with processing of fresh antimony and tin-based alloy feed materials through the metallurgical furnace system, has the effect of driving the impurity levels in the lead bullion higher, thereby increasing the quantity of dross in circulation.

The impact of this approach results in longer processing times, reduced equipment life, higher levels of reagent consumption, and higher smelter costs per time of process lead. Consequently, periodic purges would be required to reduce the impurity levels and the level of the dross in circulation. Disposal of the dross is not an attractive option because of potential environmental concerns. Likewise, the cost of disposal of such dross can tend to be prohibitive. Additionally, and still further, the economic value of the metals tied up in the dross would be thereby lost.

Other disadvantages of a pyrometallurgical approach of this type include the relatively high temperatures involved and the vast expenditure of energy required to accomplish the reactions. Similarly, the emission of hazardous fumes, gasses and dust can result; and the production of the slag which results is expensive to dispose of due to environmental constraints.

There is certainly a substantial need to provide an effective process for dealing with the problem discussed herein. However, despite the work that has been carried out, a satisfactory solution is not believed to have been provided.

Accordingly, and in general, a principal object of the present invention is to provide a facile method of treating alloys or drosses containing lead and other metallic impurities to separate and recover the metal components. A more specific object lies in the provision of a hydrometallurgical method to solubilize and effect separation of the metal components so as to allow recovery thereof.

Yet another object of the present invention provides an economic process for separating the metallic components from a dross or alloy source. A more specific and related object lies in the provision of a method in which fuel costs used are minimized, lower working temperatures can be utilized, and the apparatus requirements are relatively small in comparison to pyrometallurgical process requirements.

A still further and more specific object is to provide a hydrometallurgical treatment which allows, if not effectively eliminates, the emission of lead fumes and volatile dust and substantially reduces the emission of sulfur oxide gasses.

Another object of the present invention is to provide a process which can be utilized in connection with existing processes, such as processes utilizing pyrometallurgy, so as to provide efficient processes with minimal additional capital investment.

Yet another object provides a method compatible with other known pyrometallurgical or hydrometallurgical processes to allow recovery of the metal values resulting from the present invention.

Other objects and advantages of the present invention will become apparent as the following description proceeds, taken in conjunction with the accompanying drawings.

SUMMARY OF THE INVENTION

In general, the hydrometallurgical method of the present invention involves initially decomposing the dross or alloy material source to provide a slurry of relatively small particle size solids. Then, through a number of chemical operations and solid/liquid separation steps, the respective metal components can be individually removed and recovered by selection of appropriate parameters determined to provide the appropriate separation.

Pursuant to one preferred embodiment, the solid phase from an initial solid/liquid separation following the decomposition of the dross is treated to first solubilize the lead values and then insolubilize to provide a solid phase, rich in lead and antimony values. If desired for the particular application, the antimony values can then be separated to the extent desired to yield soft lead precursors.

Another embodiment treats the solid phase from the initial solid (liquid) with an antimony leach to solubilize the antimony values. A second solid (liquid) separation yields the soft lead precursor as the solid phase.

The methods of the present invention can be utilized to tailor the process sequence to satisfy the requirements of a particular application. The desired element-rich phases can be treated, and the respective values recovered, as considered appropriate for economic and other conditions. Thus, the present invention yields soft lead precursors which can be converted to soft lead in a facile fashion via pyrometallurgy (where the soft lead precursors or lead sulfate, lead carbonate or the like) or via aqueous electrowinning (where the soft lead precursors are soluble lead salts, such as lead fluoroborate, $Pb(BF_4)_2$, lead fluorosilicate, $Pb(SiF_6)_2$, lead nitrate, $Pb(NO_3)_2$, and the like).

DETAILED DESCRIPTION OF THE INVENTION

Figure 1:
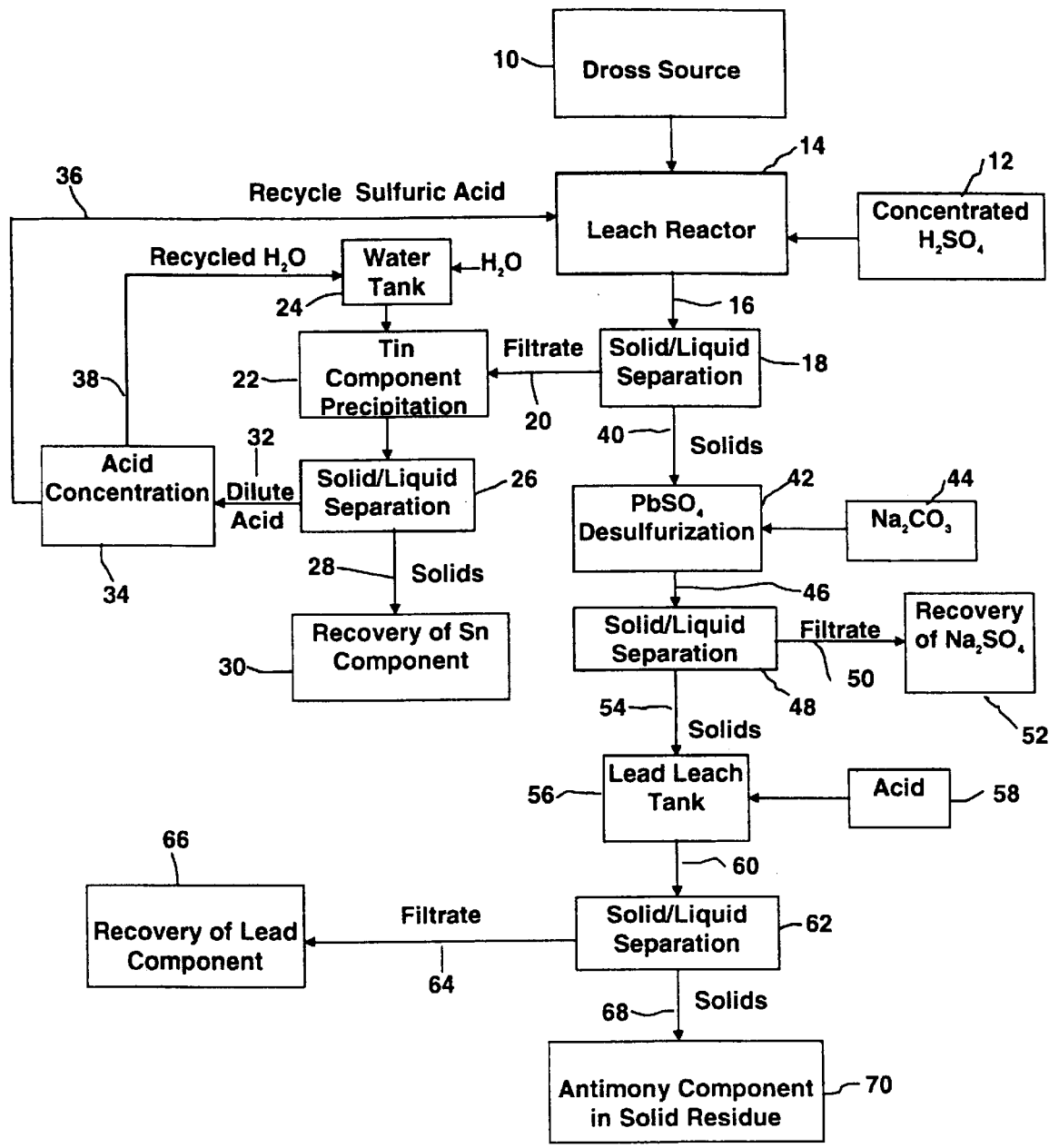
FIGS. 1 and 2 are flow diagrams each illustrating a stand-alone hydrometallurgical method for separating tin and antimony and lead from alloy/drosses containing such metal components.
Figure 2:
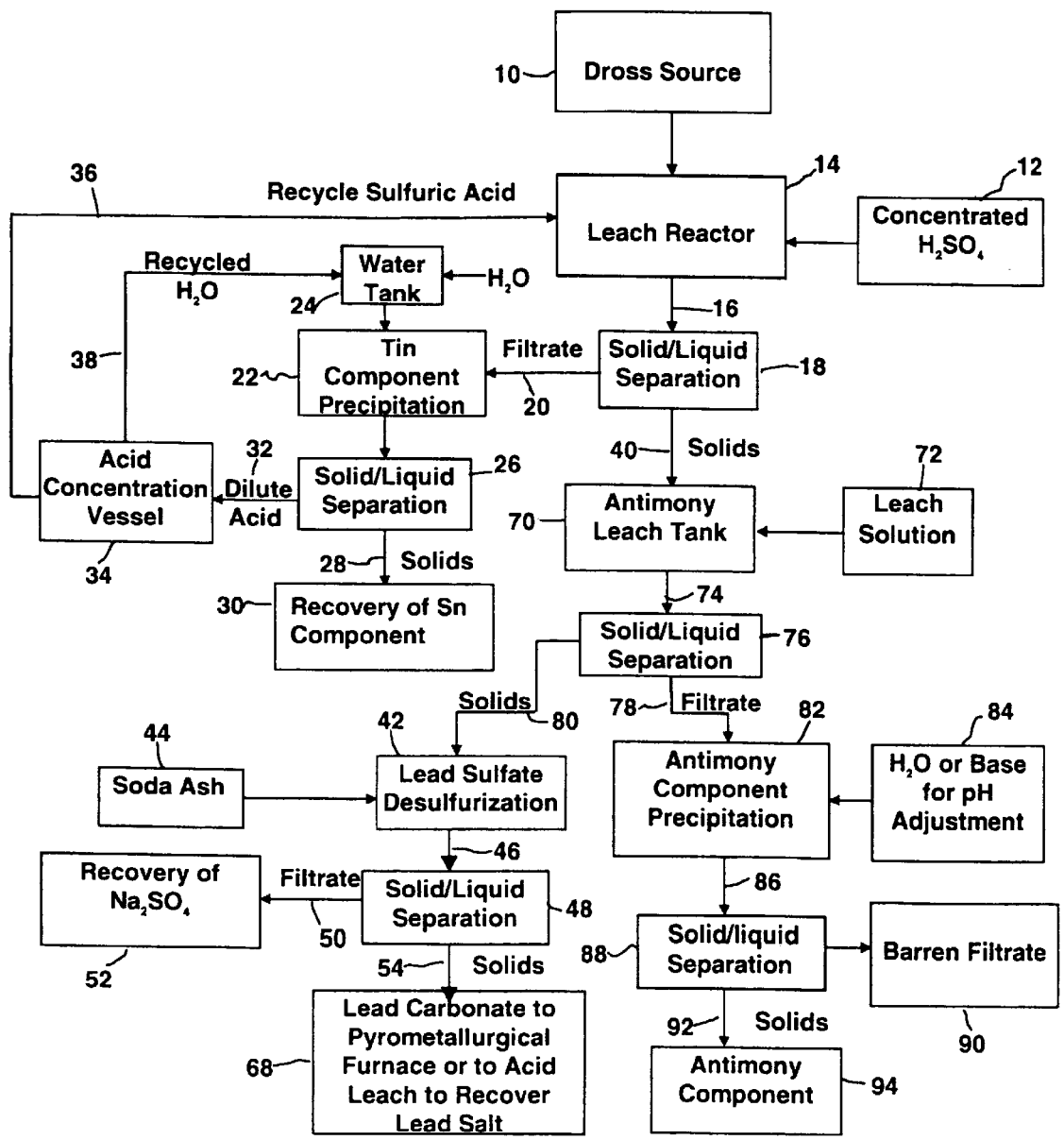

As should be appreciated, the following description of the two method embodiments illustrated in FIGS. 1 and 2 assume that the various element-rich phases are not only separated, but that the respective element-rich phase is recovered.

However, the principal objective is to obtain a lead product having a purity sufficient for making soft lead for use in lead-based alloys, such as calcium-containing lead-based alloys, as is known, as well as other applications for soft lead. The recovery of other element-rich phases (e.g., tin after separation from the lead-rich phase is optional, dependent upon economic, environmental or other conditions.

The material used as the charge for the hydrometallurgical process of the present invention can be any material containing, in addition to lead, tin and/or antimony as well as other alloying ingredients. As one typical example, in recovery of lead-containing materials, such as those resulting from scrap batteries, processing often includes use of a reverbatory furnace, followed by a blast furnace and then processing in a refinery kettle. The material resulting from the refinery kettle is a useful source of a starting material for the present invention. As used herein, the terminology "dross source" will be used to connote the lead-containing material from whatever source having also tin and/or antimony values.

As shown in FIG. 1, the dross source 10 is mixed with concentrated sulfuric acid 12 into a leach reactor 14 to decompose the dross source material. According to the preferred embodiment, concentrated sulfuric acid is used so that the initial heat input to the leach reactor 14 does not go to concentrating the acid solution by evaporating the water content in the acid before the reaction can proceed to satisfactory completion. Suitable concentration of the sulfuric acid can range, as an illustrative range, from about 1.2 to about 1.84 specific gravity.

The ratio of the dross source to the acid can vary widely. A range of from about 1:1 to about 1:100, preferably a range of 1:1 to 1:5, will be suitable. If desired, the mixture may be heated to fuming or boiling so as to further decompose the material. Inasmuch as the reaction rate is dependent upon the temperature, the exposed surface area of the reacting particles and the concentration of the acid, it is advantageous that the lead-bearing dross source be reduced to very small particle sizes. Accordingly, the slurry may be agitated during the digestion thereof by any suitable means. Illustrative agitation equipment comprises mixers, stirrers, turbines and agitators.

Pursuant to a preferred embodiment, additives can be included in the leach reactor so as to raise the effective reaction temperature. In this fashion, fuming of the sulfuric acid is diminished and, as a result, the concomitant emission of sulfur oxide gasses. Suitable additives for this purpose comprise the sodium or potassium sulfate or bisulfates. Any other additive which functions to raise the effective reaction temperature without unduly adversely affecting the objectives of this invention can be used.

Table 1 is an illustrative example showing the effect of different levels of sodium sulfate upon the boiling temperature of the slurry and also increasing the effective reaction temperature:

TABLE 1

| % $SO_4^{-2}$ from $Na_2SO_4$[1] | Slurry Boiling Temperature |
| --- | --- |
| 0 | 127° C. |
| 2.0 | 133° C. |
| 4.0 | 135° C. |
| 8.4 | 139° C. |
| 13.1 | 141° C. |

[1]Weight percent based on the weight of the solution.

Pursuant to a preferred embodiment of the process of the present invention, an oxidizing agent is introduced into the leach reactor 14 prior to, or during, the digestion of the dross source to accelerate the decomposition of the dross source and to promote oxidation of the antimony component to its highest oxidation state.

Solutions of pentavalent antimony are easily hydrolyzed and are therefore more prone to retention in the solid phase than antimony present in the corresponding trivalent solution. In this fashion, the preferred use of an oxidizing agent can reduce significantly the possible contamination of the filtrate with antimony. In the leaching step, the tin component of the dross source goes into solution as tin sulfate, leaving the antimony and lead components in the solid phase.

Suitable oxidizing agents for addition to the leach reactor 14 include hydrogen peroxide, nitric acid or $Fe^{3+}$ ions, $Ce^{4+}$ ions, $Cu^{2+}$ ions, or $MnO_4^-$. Suitable levels of the oxidizing agent can be determined in straightforward fashion depending upon an assay of the relative antimony level in the dross source, or by other suitable methods.

The slurry 16 from the leach reactor 14 is then subjected to first solid-liquid separation 18. As previously noted, the liquid phase obtained contains the tin values while the solids comprise the antimony and lead values. Suitable equipment for this and the other solid/liquid separations used herein is known and may be utilized. Illustrative suitable examples comprise pressure or vacuum filtration, centrifugation, and sedimentation.

The first solid/liquid separation 18 preferably should be accompanied by a thorough rinsing of the solid phase with first, a dilute sulfuric acid rinse, preferably in the ratio of 1:1 acid to water or greater, followed by a more dilute acid or plain water rinse. Excessively dilute sulfuric acid solution rinse or plain water rinse of the solids when the solid phase in the solid/liquid separation 18 still contains significant amounts of the filtrate can result in hydrolysis and precipitation of the tin components into the solid phase, thereby reducing the separation efficiency of the component.

Where desired, the tin-rich phase can then be recovered by any suitable treatment. Preferably, and as shown in FIG. 1, recovery of the tin component from liquid 20 is accomplished by lowering the acidity of the concentrated sulfuric acid filtrate 20. Thus, precipitation reactor 22 achieves the precipitation of the tin component by dilution of the filtrate 20 with water 24 or by neutralization of the filtrate 20 with a base. The tin component hydrolyzes to form hydrated tin oxide or metastannic acid which may then be recovered by a second solid/liquid separation 26.

The conditions necessary to precipitate the tin component can vary as desired. It should be suitable to dilute the filtrate with water in a ratio of from about 1:1 to about 1:100.

The solid/liquid separation 26, and the precipitation of the tin component can be aided by, if desired, evaporation of the dilute or neutralized filtrate. This may be accomplished by either heating the solution mixture or by allowing the mixture to settle in a vessel having a relatively large surface area exposed to the atmosphere. As may be appreciated, heating the solution rapidly hydrolyzes the tin component; whereas, on the other hand, evaporation by exposure of the solution to the atmosphere might take a few days or so. The solid components 28 then yields the tin component 30. The tin values may be obtained from the solid tin component 30 by any suitable means, as is known.

In the most preferred embodiment, the dilute acid from the solid/liquid separation 26 is concentrated in step 34 by evaporation of the water content 38 which may be recycled to the water tank 24 for Sn component precipitation. The concentrated acid stream 36 then serves as, if desired, a recycle to the leach reactor 14, as shown.

The solid phase 40 from first solid/liquid separation 18 comprises predominantly lead sulfate and oxides and/or sulfates of antimony. In one embodiment of the process of the present invention, as is illustrated in FIG. 1, a lead-rich phase is obtained by first insolubilizing the lead values, and then solubilizing such lead values by insolubilizing the antimony-rich phase. In FIG. 1, to this end, the solid phase 40 is subjected to a desulfurization step 42 by any suitable means, as is known. An illustrative suitable example consists of treating the solids 40 with a sodium carbonate solution 44. The lead sulfate is converted to insoluble lead carbonate, and the sulfur component is solubilized.

The stream 46 from the desulfurization step 42 is then subjected to a third solid/liquid separation 48. The solubilized sulfate source comprising the filtrate 50 may be recovered as shown at 52, for further use, by crystallization from filtrate 50.

The solids 54 from the sulfate conversion step 42 and the third solid/liquid separation step 48 contains substantially all the lead and antimony values in the treated dross feed. Pursuant to the present invention, the solids are then solubilized to provide a lead-rich liquid phase. As shown, solids 54 are then acid leached in a suitable solution to dissolve the lead compounds therein, as shown at 56. Suitable acid solutions comprise, as illustrative examples, fluoroboric, fluorosilisic, acetic, nitric, sulfamic, or alkane sulfonic acids. Indeed, any acids can be utilized which provide soluble lead salts. The product stream 60 from acid leach 56 is then subjected to a fourth solid/liquid separation 62. Liquid 64 from the fourth solid/liquid separation 62 comprises the lead values while line 68 contains the antimony component.

The lead salt can be recovered as shown at 66 by any suitable technique. It has been found satisfactory to recover the lead component by crystallization from the solution. Alternatively, a secondary treatment such as electrowinning can be used to recover the lead value from the soft lead precursor, here the soluble lead salts.

The solids 68 consist substantially of the antimony value and any unreacted lead. If desired, any remaining lead value in solids 68 can be further reduced by a nitric acid leach or the like, preferably in the presence of an oxidization agent such as a peroxide at an elevated temperature, followed by solid/liquid separation. The resulting solid residue 70 obtained then comprises essentially antimony compounds with only trace amounts of lead.

In another embodiment of the process as depicted in FIG. 2 of the present invention, the initial process steps down through the first solid/liquid separation 18 are the same as those steps in the process of FIG. 1. For simplicity, these common steps in the process of FIG. 2 are numbered the same as those in FIG. 1. In contrast to the treatment of the solids 40 with a lead desulfurization step in the process of FIG. 1, after separation of the tin-rich phase as in the method of FIG. 1, the antimony- and lead-rich phases are separated by first solubilizing the antimony values and then separating via solid/liquid separation. As seen in FIG. 2, the solids 40 from the first solid/liquid separation step 18 are transferred to a leaching tank 70 where the antimony component is extracted into the solution phase. The leach solution comprises a mixture of a halogen acid, preferably hydrochloric acid, and sulfuric acid. In the antimony leach tank, antimony goes into solution as the halide, leaving lead in the solid phase.

Lead is known to dissolve in HCl solutions to form lead chloride, particularly when the chloride concentration is high. The application of a dilute HCl solution tends to reduce the dissolution of lead. It has further been found that the presence of sulfuric acid in the lead solution enhanced further the rejection of lead from the filtrate by converting any soluble lead chloride formed to insoluble lead sulfate.

The composition of the leach solution for the recovery of the antimony component can vary widely. However, the amount of HCl added should be more than the stiochiometric requirements for the antimony in the dross source, and the amount of sulfuric acid should be more than adequate to convert to lead sulfate any lead chloride formed. Hydrochloric acid concentrations in the range of 0.1–6 molar, preferably less than 3 molar, and $H_2SO_4$ concentrations in the range of 0.01–1 molar, have been found to be generally effective.

Although the leaching can be performed at ambient conditions, a higher temperature in the range of 40° C.–80° C. is preferred. It is important that the temperature should not be so high as to cause the loss by evaporation of antimony chloride. The slurry 74 from the antimony leach tank 70 is subjected to a third solid-liquid separation step 76. The filtrate 78, comprising the chloride of antimony, goes into a precipitation tank 82 where water or a base selected from the group of hydroxides, carbonates or bicarbonates of ammonia, sodium, or potassium, or any other suitable base, as shown at 84, is added to the filtrate to raise the pH of the solution. When the pH of the solution is sufficiently high (>2), the antimony chloride hydrolyzes to the oxide and/or oxychloride of antimony. The antimony component 86 is recovered after a further solid/liquid separation step 88. Antimony component stream 92 is thus recovered as a white solid 94. The barren filtrate 90 can be disposed of as dictated by the requirements of the process plant.

The sulfated solids 80 from the third solid/liquid separation step 76, consisting predominantly of the lead component, are subjected to a desulfurization step 42 by known suitable process to convert lead sulfate to insoluble lead carbonate and to solubilize the sulfur component, as also carried out in the process of FIG. 1. The slurry 46 from the desulfurization step 42 is subject to fifth solid/liquid separation step 48 to recover the carbonated lead solids 68. The carbonated lead solids, i.e., the soft lead precursor, with only traces of other components such as tin, antimony, and sulfate, can be sent to a pyrometallurgical furnace for the recovery of soft lead by known pyrometallurgical processes.

Alternatively, as disclosed in conjunction with the initial embodiment, the carbonated lead solids can be leached with a suitable acid solution, preferably fluoroboric acid, fluorosilisic acid, acetic acid, nitric acid, sulfamic acid, or alkane sulfonic acid to produce the lead salt of the acid. The solution of lead salt is obtained by solid/liquid separation. The lead salt can be recovered by crystallization from the solution or can be subjected to secondary treatment such as electrowinning to recover the lead value.

The method described herein comprises a stand-alone process for obtaining soft lead from dross sources containing both antimony and tin components. As may be appreciated, if the dross source contains no more than a minimal and acceptable level of antimony, the illustrative process can be simplified, eliminating the aspects of the processing stemming from the presence of an antimony constituent. Similarly, if the dross source does not contain appreciable amounts of a tin component, then the steps associated with the separation of the tin component can certainly be eliminated.

Still further, if desired, there may be applications where each of the principal constituents need not be separated. For example, it may be satisfactory for some applications to provide either a lead product containing a tin component or a lead source containing antimony. Still further, if desired, the present process could be used with an existing reverbatory furnace process. Thus, the dross source could separate out the tin component and then the resulting solids 34 could be used as the feed for a reverbatory furnace to oxidize the antimony constituent, thereby providing a soft lead source.

Also, while the present invention has been described in conjunction with dross sources of lead containing tin and/or antimony components, it should be appreciated that the present invention can be utilized to treat dross sources containing other alloying ingredients used in lead-acid batteries. Examples include calcium-based lead alloys containing tin and/or antimony components.

The following Examples further illustrate the present invention but, of course, should not be construed as in any way limiting the scope of this invention.

EXAMPLE 1

This Example illustrates the use of the process sequence shown in FIG. 1.

100.1 g of kettle dross consisting of 81.4% lead, 4.4% Sb, and 5.1% Sn was leached with a mixture of 140 ml sulfuric acid solution (sg 1.84), 20 ml 30 wt. % $H_2O_2$, and 40 ml water at 200° C. for 60 minutes. The slurry was agitated during the leaching process. After leaching, the slurry was allowed to cool as the sulfated solids settled to the bottom of the beaker.

Separation of the sulfated solids from the liquid phase consisted of decanting the clear liquid through the filter, followed by vacuum filtration and washing of the solids with dilute sulfuric acid (1:1) and plain water.

The filtrate comprising the original filtrate and wash solution was diluted with plain water in a ratio of 1:4 followed by heating to between 90° C. and 105° C. A creamy white hydrated tin oxide precipitate was recovered from the solution by vacuum filtration. Elemental analysis of the 5.8 g of dry precipitate recovered indicated a composition of 65% Sn, 7% Sb and 0.1% Pb. The recovery efficiency of the Sn component from the dross as the hydrated tin oxide was determined to be 88%.

The sulfated solids comprised 99.4% of the Pb, 91.6% of the Sb and 7.4% of the Sn in the dross. The sulfated solids were slurried in water in a ratio of 1:2 by weight. Soda ash in a ratio of 1:3 with respect to the sulfated solids was added to the slurry, and the mixture heated to 60° C. for 30 minutes to desulfurize the solids and to convert the lead sulfate to the carbonate.

The carbonated solids were filtered and then treated with a 30 weight percent fluoroboric acid solution in a ratio of 3:1 acid to solids at room temperature. The fluoroboric acid filtrate obtained after filtering out the insoluble residue had a composition of 12.2% Pb, 0.1% Sb and 0.05% Sn, which translates into a recovery efficiency of 91% for the Pb component in the dross as lead fluoroborate.

The solid residue contained 24.3% Pb, 14.1% Sb and 0.4% Sn. This residue was subjected to further leaching with nitric acid and hydrogen peroxide mixture to extract the residual lead, resulting in a final solid residue of composition 6.4% Pb, 27.0% Sb and 0.08% Sn. This final solid residue comprised 48.3% of the Sb in the dross.

EXAMPLE 2

This Example shows use of the process depicted in FIG. 2. 200.2 g of kettle dross sample consisting of 80.0% lead, 5.0% sb, and 4.3% Sn was leached with 300 ml of 1.5 sg sulfuric acid solution in a glass beaker at 160° C. for 120 minutes with the slurry under constant agitation. After leaching, separation of the sulfated solids from the liquid phase was accomplished by centrifugation followed by decantation of the clear liquid through a filter. The sulfated solids were washed first with dilute sulfuric acid (1:1), followed by plain water rinse. The wash solution was mixed with the original concentrated sulfuric acid filtrate to provide the solution for the recovery of the tin component.

The concentrated filtrate solution was diluted with plain water in a ratio of 1:4 followed by heating to about 90° C.–105° C. to accelerate the precipitation of hydrated tin oxide which was recovered from the solution by centrifugation followed by vacuum filtration. Elemental analysis of the dried tin component precipitate indicated a composition of 60.4% Sn, 2.2% Sb and 0.002% Pb. The recovery of Sn component in the dross as the hydrated oxide was 89%.

The sulfated solids comprised 99.8% of the Pb, 97.1% of the Sb, and 11% of the Sn in the dross. The sulfated solids were leached with 200 ml of 1:4 dilute hydrochloric acid in the presence of about 10 ml concentrated sulfuric acid for about 30 minutes at approximately 60° C. The HCl slurry was filtered. Ammonium hydroxide solution was added to the filtrate to raise the pH and to precipitate out the antimony component. 13.9 g of dried antimony component with a composition of 48.1% Sb, 5.2% Sn and 2.3% Pb was recovered. The recovery efficiency of Sb as the hydrated oxide component from the dross was 62%.

The sulfated solids after recovery of the antimony component was treated with 300 ml of 0.3 g/L sodium carbonate solution at 60° C. for 60 minutes to convert the lead sulfate to lead carbonate. 213.7 g of carbonated lead solids of composition 73.9% Pb, 1.4% Sb and 0.2% Sn was recovered. The carbonated solids, comprising about 98% of the lead in the dross, were leached with fluoroboric acid solution consisting of 250 ml 50 weight percent fluoroboric acid plus 250 ml water to produce a fluoroboric acid electrolyte. The composition of this electrolyte was 14.7% Pb, 0.1% Sb and 0.005% Sn and contained 131.4 g of the lead in the dross. The final solid residue weighed 57.2 g with composition 44.8% Pb, 2.8% Sb and 0.2% Sn.

Thus, as has been seen, the present invention provides a facile process for yielding a soft lead product. The process is highly versatile and may be tailored to the particular application, likewise eliminating at least the principal problems of prior processes as discussed herein. The materials of construction and suitable equipment for the various steps is known and may be used. The particular materials and equipment do not form a part of this invention. Also, as used herein, and as may be appreciated, nothing should be construed as indicating that any of the separated element-rich streams are totally devoid of the other components. Thus, as is apparent from the Examples, each of the tin-, antimony- and lead-rich phases contains some amount of the other components. However, as is also evident, the methods of this invention achieve predominant (i.e., majority) separation of the respective values and achieve a source of soft lead that can be economically recovered. While the present invention is susceptible to various modifications and alternative forms, specific embodiments thereof have been described in detail herein. It should be understood, however, that it is not intended to limit the invention to the particular forms disclosed, but, on the contrary, the intention is to cover all modifications, equivalents and alternatives falling within the spirit and scope of the invention as expressed in the appended claims.

I claim:

1. A method for recovering soft lead precursor from a dross source containing undue levels of at least one of antimony and tin and wherein the desired soft lead precursor requires separating at least one of the antimony and tin components, the method comprising:
   (a) providing a lead-containing dross source having at least antimony and tin at an amount requiring separation,
   (b) mixing the dross source with sulfuric acid to decompose the dross source to provide a slurry in which the liquid phase contains the tin values and the solid phase contains the antimony and lead values and a sulfur component,
   (c) subjecting said slurry to a first solid/liquid separation and recovering a solid phase therefrom,
   (d) treating the solid phase recovered from the first solid/liquid separation by the treatment selected from the group consisting of:
      (i) solubilizing a sulfur component of the solid phase, and
      (ii) solubilizing by an antimony leach to provide an antimony-rich liquid while obtaining a lead-rich solid phase, and then
   (e) recovering a soft lead precursor.

2. The method of claim 1 wherein the sulfuric acid used in step (b) has a concentration of about 1.2 to about 1.84 specific gravity and the ratio of the dross source to the acid is in the range of from about 1:1 to about 1:100.

3. The method of claim 1 wherein an additive is included with the sulfuric acid which raises the effective reaction temperature during the decomposition of the dross source.

4. The method of claim 3 wherein said additive is sodium sulfate.

5. The method of claim 1 wherein the decomposition of the dross source includes an oxidizing agent to promote oxidation of the antimony values to their highest oxidation state.

6. The method of claim 1 wherein said first solid/liquid separation is accompanied by a rinsing of the solid phase with a dilute sulfuric acid rinse, followed by a rinse with either a more dilute acid or water.

7. The method of claim 1 wherein the tin-rich phase separated in step (c) is treated by lowering the acidity to precipitate the tin values.

8. The method of claim 1 wherein the solid phase from step (d) is treated by a leaching step to dissolve the lead values, followed by separating the thereby-produced lead value liquid stream from the antimony-rich solid phase by a solid/liquid separation, and then recovering the lead values from the separated lead-rich liquid phase.

9. The method of claim 1 wherein step (d) is carried out by subjecting the solid phase from the first solid/liquid separation to an antimony leach to solubilize the antimony values to produce an antimony-rich liquid phase and then subjecting the thereby-produced slurry to a further solid/liquid separation to separate the solid lead-rich phase from the liquid antimony-rich phase.

10. The method of claim 9 wherein the lead-rich solid phase is treated by desulfurization to convert the lead values to lead carbonates, thereafter subjecting the desulfurized product to another solid/liquid operation, and thereafter recovering the lead values from the solid phase.

* * * * *